(12) United States Patent
Lee (10) Patent No.: US 11,760,341 B2
(45) Date of Patent: Sep. 19, 2023

(54) AUTONOMOUS PARKING METHOD AND VEHICLE SYSTEM PERFORMING THE SAME

(71) Applicants: HYUNDAI MOTOR COMPANY, Seoul (KR); Kia Corporation, Seoul (KR)

(72) Inventor: Jae Yong Lee, Chungju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/528,662

(22) Filed: Nov. 17, 2021

(65) Prior Publication Data

US 2022/0371578 A1 Nov. 24, 2022

(30) Foreign Application Priority Data

May 18, 2021 (KR) ........................ 10-2021-0063904

(51) Int. Cl.
| | |
|---|---|
| *G08G 1/14* | (2006.01) |
| *B60W 30/06* | (2006.01) |
| *B60W 40/08* | (2012.01) |
| *B60W 50/14* | (2020.01) |
| *B62D 15/02* | (2006.01) |
| *G06V 20/58* | (2022.01) |
| *G06V 20/59* | (2022.01) |

(52) U.S. Cl.
CPC ............ *B60W 30/06* (2013.01); *B60W 40/08* (2013.01); *B60W 50/14* (2013.01); *B62D 15/028* (2013.01); *B62D 15/0285* (2013.01); *G06V 20/586* (2022.01); *G06V 20/597* (2022.01); *B60W 2050/146* (2013.01); *B60W 2540/18* (2013.01); *B60W 2540/225* (2020.02); *B60W 2556/40* (2020.02); *B60W 2556/50* (2020.02)

(58) Field of Classification Search
CPC ...... B60W 30/06; B60W 40/08; B60W 50/14; B60W 2050/146; B60W 2540/18; B60W 2540/225; B60W 2556/40; B60W 2556/50; B60W 10/20; B60W 30/18054; B60W 40/02; B60W 60/001; B60W 2420/42; B60W 2556/45; B62D 15/028; B62D 15/0285; G06V 20/586; G06V 20/597; B60Y 2300/06; B60Y 2300/1805; B60Y 2400/30
USPC ............. 340/932.2, 937, 933, 988, 989, 990
See application file for complete search history.

(56) References Cited

U.S. PATENT DOCUMENTS

| | | | |
|---|---|---|---|
| 2019/0232952 A1* | 8/2019 | Kim ........................ | G08G 1/143 |
| 2019/0291713 A1* | 9/2019 | Kogure ................. | B60W 10/26 |
| 2020/0406889 A1* | 12/2020 | Yamanaka ........... | G05D 1/0011 |

(Continued)

*Primary Examiner* — Anh V La
(74) *Attorney, Agent, or Firm* — Morgan, Lewis & Bockius LLP (57) ABSTRACT

A vehicle system includes, a sensing device configured to detect vehicle status information including gear-stage information and steering information of a steering wheel, and a control device configured to determine a target parking spot among parking spots included in a parking lot based on the gear-stage information and the steering information when the vehicle maintains a stopped state for more than a predetermined period in the parking lot, and to execute an autonomous parking function for parking at the target parking spot.

28 Claims, 5 Drawing Sheets

(56) References Cited

U.S. PATENT DOCUMENTS

2021/0118299 A1* 4/2021 Yata .................... B60W 30/06
2021/0179089 A1* 6/2021 Hara .................... B60W 30/09

* cited by examiner

AUTONOMOUS PARKING METHOD AND VEHICLE SYSTEM PERFORMING THE SAME

CROSS-REFERENCE TO RELATED APPLICATION

This application claims priority to and the benefit of Korean Patent Application No. 10-2021-0063904 filed on May 18, 2021 in the Korean Intellectual Property Office, the entire contents of which are incorporated herein by reference.

TECHNICAL FIELD

The present disclosure relates to an autonomous parking method and a vehicle system performing the same.

BACKGROUND

With the recent advancement of technology, vehicles capable of autonomous driving and autonomous parking have been developed and spread. In general, in a vehicle equipped with an autonomous parking function, when the driver executes the autonomous parking function through a separate switch operation or execution instruction, the vehicle system may perform searching of available parking spot in the parking lot, guidance of the parking path, and operation of the vehicle for parking.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an autonomous parking method and a vehicle system performing the same capable of performing autonomous parking function by identifying driver's intention.

A vehicle system includes, a sensing device configured to detect vehicle status information including gear-stage information and steering information of a steering wheel, and a control device configured to determine a target parking spot among parking spots included in a parking lot based on the gear-stage information and the steering information when the vehicle maintains a stopped state for more than a predetermined period in the parking lot, and execute an autonomous parking function for parking at the target parking spot.

The control device may be configured to determine a parking spot positioned on a left side of the vehicle, or a parking spot positioned on a right side of the vehicle as the target parking spot based on a steering direction of the steering wheel.

The control device may be configured to determine a parking spot positioned at a front, a side, or a rear of the vehicle as the target parking spot based on the gear-stage information.

The vehicle system may further include at least one camera positioned in the vehicle. The control device may be configured to obtain drivers gaze information through the at least one camera, and determine the target parking spot by additionally using the gaze information.

The control device may be configured to determine a direction toward the target parking spot relative to the vehicle based on a gaze direction corresponding to the gaze information and a steering direction of the steering wheel.

The control device may be configured to determine, as the target parking spot, a parking spot determined by a combination of the steering direction and a direction indicated by the gaze direction among forward, lateral, and rearward of left side or right side of the vehicle.

The vehicle system may further include a display device. The control device may be configured to display a parking lot image corresponding to the parking lot through the display device, and provide position information for the target parking spot determined by the vehicle to a driver by operating the display device such that a parking spot in the parking lot image determined as the target parking spot blinks, or that a parking spot determined as the target parking spot is highlighted.

The vehicle system may further include a communication device configured to communicate with a parking system managing the parking lot. The control device may be configured to receive parking map information corresponding to the parking lot from the parking system, identify at least one empty parking spot within the parking lot based on the parking map information, and determine the target parking spot from among the at least one empty parking spot.

The vehicle system may further include at least one detection device configured to obtain surrounding environment information of the vehicle. The control device may be configured to identify at least one empty parking spot within the parking lot based on the surrounding environment information, and determine the target parking spot from among the at least one empty parking spot. The at least one detection device may include at least one camera or at least one sensor positioned in the vehicle.

A vehicle system includes, at least one camera positioned in the vehicle, a sensing device configured to detect steering information of a steering wheel, and a control device, where the control device may be configured to: obtain drivers gaze information through the at least one camera, determine a target parking spot among parking spots included in the parking lot based on the gaze information and the steering information, when the vehicle maintains a stopped state for more than a predetermined period in a parking lot, and execute an autonomous parking function for parking at the target parking spot.

The control device may be configured to determine a direction toward the target parking spot relative to the vehicle based on a gaze direction corresponding to the gaze information and a steering direction of the steering wheel.

The control device may be configured to determine a direction toward the target parking spot relative to the vehicle based on a gaze direction corresponding to the gaze information and a steering direction of the steering wheel.

The vehicle system may further include a display device. The control device may be configured to display a parking lot image corresponding to the parking lot through the display device, and provide position information for the target parking spot determined by the vehicle to the driver by operating the display device such that a parking spot in the parking lot image determined as the target parking spot blinks, or a parking spot determined as the target parking spot is highlighted.

The vehicle system may further include a communication device configured to communicate with a parking system managing the parking lot. The control device may be configured to receive parking map information corresponding to the parking lot from the parking system, identify at least one empty parking spot within the parking lot based on the parking map information, and determine the target parking spot from among the at least one empty parking spot.

The vehicle system may further include at least one detection device configured to obtain surrounding environment information of the vehicle. The control device may be configured to identify at least one empty parking spot within the parking lot based on the surrounding environment information, and determine the target parking spot from among the at least one empty parking spot. The at least one detection device may include at least one camera or at least one sensor positioned in the vehicle.

An autonomous parking method of a vehicle includes, obtaining gear-stage information of the vehicle and steering information of a steering wheel, determining a target parking spot among parking spots included in a parking lot based on the gear-stage information and the steering information when the vehicle maintains a stopped state for more than a predetermined period after entering the parking lot, and executing, by the vehicle, an autonomous parking function for parking at the target parking spot.

The determining may include determining a parking spot positioned on a left side of the vehicle, or a parking spot positioned on a right side of the vehicle as the target parking spot based on a steering direction of the steering wheel.

The determining may include, obtaining driver's gaze information from an image photographing the driver through at least one camera positioned in the vehicle, and determining the target parking spot by additionally using the gaze information.

The determining the target parking spot by additionally using the gaze information may include, determining a direction toward the target parking spot relative to the vehicle according to a gaze direction corresponding to the gaze information and a steering direction of the steering wheel, and determining the target parking spot at a left side or a right side of the vehicle based on the determined direction.

The determining may include determining the target parking spot at a front, a side, or a rear of the vehicle based on a current gear-stage position of the vehicle.

The autonomous parking method may further include displaying a parking lot image corresponding to the parking lot on a screen. In the parking lot image, a parking spot in the parking lot image determined as the target parking spot may blinks, or a parking spot determined as the target parking spot may be highlighted, to provide position information for the target parking spot determined by the vehicle to a driver.

The autonomous parking method may further include, receiving parking map information corresponding to the parking lot from a parking system managing the parking lot, and identifying at least one empty parking spot within the parking lot based on the parking map information. The determining may include determining the target parking spot from among the at least one empty parking spot.

The autonomous parking method may further include, obtaining surrounding environment information of the vehicle through at least one detection device, and identifying at least one empty parking spot within the parking lot based on the surrounding environment information. The determining may include determining the target parking spot from among the at least one empty parking spot. The at least one detection device may include at least one camera or at least one sensor positioned in the vehicle.

An autonomous parking method of a vehicle includes, obtaining drivers gaze information from an image photographing a driver through at least one camera positioned in the vehicle, detecting steering information of a steering wheel, determining a target parking spot among parking spots included in a parking lot based on the gaze information and the steering information when the vehicle maintains a stopped state for more than a predetermined period in the parking lot, and executing an autonomous parking function for parking at the target parking spot.

The determining may include determining the target parking spot at a left side or a right side of the vehicle based on a gaze direction corresponding to the gaze information and a steering direction of the steering wheel.

The autonomous parking method may further include displaying a parking lot image corresponding to the parking lot on a screen. In the parking lot image, a parking spot in the parking lot image determined as the target parking spot may blink, or a parking spot determined as the target parking spot may be highlighted, to provide position information for the target parking spot determined by the vehicle to the driver.

The autonomous parking method may further include, receiving parking map information corresponding to the parking lot from a parking system managing the parking lot, and identifying at least one empty parking spot within the parking lot based on the parking map information. The determining may include determining the target parking spot from among the at least one empty parking spot.

The autonomous parking method may further include, obtaining surrounding environment information of the vehicle through at least one detection device, and identifying at least one empty parking spot within the parking lot based on the surrounding environment information. The determining may include determining the target parking spot from among the at least one empty parking spot. The at least one detection device may include at least one camera or at least one sensor positioned in the vehicle.

According to an exemplary embodiment, even if a driver does not operate a separate switch or input an execution, a parking spot desired by the driver is automatically identified and the vehicle is autonomously parked at the identified parking spot, thereby increasing convenience of the driver.

DETAILED DESCRIPTION OF THE EMBODIMENTS

Hereinafter, exemplary embodiments disclosed in the present specification will be described in detail with reference to the accompanying drawings. In the present specification, the same or similar components will be denoted by the same or similar reference numerals, and a repeated description thereof will be omitted.

Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present disclosure may obscure the gist of the present disclosure, it will be omitted. The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

In addition, the terms "unit", "part" or "portion", "-er", and "module" in the specification refer to a unit that processes at least one function or operation, which may be implemented by hardware, software, or a combination of hardware and software.

Figure 1:
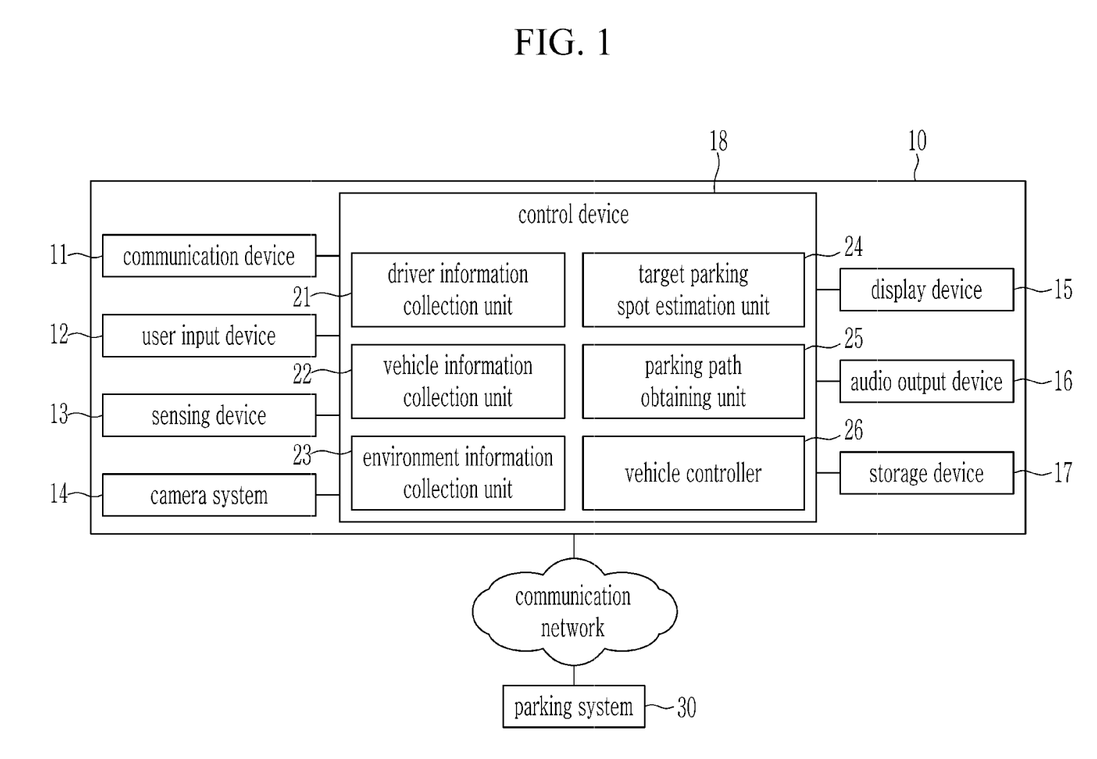
FIG. 1 schematically illustrates a vehicle system according to an exemplary embodiment.

FIG. 1 schematically illustrates a vehicle system according to an exemplary embodiment.

Referring to FIG. 1, a vehicle system 10 may include, a communication device 11, a user input device 12, a sensing device 13, a camera system 14, a display device 15, an audio output device 16, a storage device 17, and a control device 18.

The communication device 11 is connected to an external apparatus (for example, a parking system 30) through a communication network, and may transmit and receive information, data, and the like, between the vehicle system 10 and the external apparatus. For example, the communication device 11 is connected to the external parking system 30 through the communication network, and may receive parking map information from the external parking system 30. Here, the parking map information may include information (for example, partition information, shape information, and the like) on the parking lot managed by the parking system 30. The parking map information may further include information indicating a parking scheme (parallel parking or perpendicular parking) and parking availability of each parking spot. The parking map information may further include position information of the vehicle in the parking lot.

The user input device 12 may receive a control input for the vehicle system 10 from the user. The user input device 12 may include various input devices such as a touch type, a rotation type, a tilt type, a button type, etc. As an example, the user input device 12 may include a touch pad that includes a touch sensor combined with the display device 15 in a layered structure, which will be described later.

The sensing device 13 may include at least one sensor installed in the vehicle to detect a status of the vehicle. For example, the sensing device 13 may include, a steering angle sensor, an accelerator pedal position sensor (APS), a brake pedal position sensor (BPS), an acceleration sensor, and the like. The sensing device 13 may further include a sensor to detect current position information of the vehicle, for example, a global positioning system (GPS) sensor, and the like. The sensing device 13 may further include at least one sensor to detect surrounding environment of the vehicle. For example, the sensing device 13 may include at least capable of detecting locations of surrounding objects (obstacles), such as a lidar sensor, a radar sensor, an ultrasonic wave sensor, an infrared sensor, a thermal sensor, a millimeter-wave sensor.

The camera system 14 may include at least one camera disposed to photograph inside or outside of the vehicle. For example, the camera system 14 may include at least one camera configured to photograph the driver inside the vehicle. In addition, for example, the camera system 14 may include at least one camera that is installed on a front side, a left-hand side, a right-hand side, and/or a rear side of the vehicle, respectively, and configured to photograph surroundings of the vehicle.

The display device 15 includes at least one display, and may display various information and data processed by the vehicle system 10. For example, the display device 15 may display, on the screen, status information indicating the current status of the vehicle, the parking map information of the parking lot where the vehicle is located, parking guidance information that assists parking of the vehicle, and parking path information.

The audio output device 16 may output various sound signals processed by the vehicle system 10. For example, the audio output device 16 may output various guide sounds related to autonomous parking.

The storage device 17 may store various information and data processed by the vehicle system 10. For example, the storage device 17 may store the parking map information received from the external parking system 30 through the communication device 11. In addition, for example, the storage device 17 may store vehicle status information, current position information, surrounding environment information, etc. collected by the control device 18 that is described later.

The control device 18 may perform the overall control operation of the vehicle system 10. The control device 18 may be a processor (e.g., computer, microprocessor, CPU, ASIC, circuitry, logic circuits, etc.). The control device 18 may include an associated non-transitory memory storing software instructions which, when executed by the processor, provides the functionalities of a driver information collection unit 21, a vehicle information collection unit 22, an environment information collection unit 23, a target parking spot estimation unit 24, a parking path obtaining unit 25, and a vehicle controller 26. Here, the control device 18 may process signals transmitted between elements of the vehicle system 10, and in particular may process signals communicated between each unit of the control device 18 and the communication device 11, the user input device 12, the sensing device 13, the camera system 14, the display device 15, the audio output device 16, and the storage device 17. The processor may take the form of one or more processor(s) and associated memory storing program instructions.

The driver information collection unit 21 of the control device 18 may receive an image photographing the driver, for example, and an image photographing the driver's face, from the camera system 14. When the driver information collection unit 21 receives the image photographing the driver from the camera system 14, the driver's behavior information may be extracted through image analysis. The driver's behavior information may include driver's gaze information. The driver's gaze information is information indicating a gaze direction of the driver, that is, the viewing direction of the driver.

The vehicle information collection unit 22 of the control device 18 may collect various information related to vehicle status through the sensing device 13. For example, the vehicle information collection unit 22 may collect the vehicle status information that includes current gear-stage information, steering information, brake pedal operation status information, accelerator pedal operation status information, speed information, and the like of the vehicle.

The vehicle information collection unit 22 may collect vehicle position information indicating a current position of the vehicle. In this case, the vehicle information collection unit 22 may collect the current position information of the vehicle through a position sensor such as GPS included in the sensing device 13.

The environment information collection unit 23 of the control device 18 may collect the surrounding environment information that includes information (for example, position information of the surrounding object) related to surrounding object (e.g., obstacles of moving objects such as surrounding vehicles and pedestrians, fixed facilities, and the like) located around the vehicle, through at least one detection device to obtain information for the surrounding environment of the vehicle.

For example, the environment information collection unit 23 may collect the surrounding environment information of the vehicle through the lidar sensor, the radar sensor, the ultrasonic wave sensor, and the like included in the sensing device 13. The lidar sensor transmits a laser signal around the vehicle, and receives a returning signal that is reflected by the surrounding object, to detect information such as the position, the distance, the moving speed, the moving direction, and the like of the surrounding object. The lidar sensor may also be used to detect the shape information of the surrounding object by extracting 3-dimensional space information around the vehicle. The radar sensor transmits an electromagnetic wave signal around the vehicle, and based on a returning signal reflected by the surrounding object, may detect information of the position, the distance, the moving speed, the moving direction, and the like of the surrounding object. The ultrasonic wave sensor transmits an ultrasonic wave signal around the vehicle, and based on a returning signal reflected by the surrounding object, may detect information of the position, the distance, the moving speed, the moving direction, and the like of the surrounding object.

In addition, for example, the environment information collection unit 23 may obtain the surrounding environment information from image data photographing surrounding environment of the vehicle through the camera system 14. When an image data photographing the surrounding environment is received from the camera system 14, the environment information collection unit 23 may detect the position, the distance, the moving speed, the moving direction, and the like of the surrounding object through an image analysis.

The target parking spot estimation unit 24 of the control device 18 may identify an empty parking spot among the parking spots, and estimate drivers parking intention to determine a spot to part the vehicle among the empty parking spots.

Based on the parking map information received from the external parking system 30 through the communication device 11, the target parking spot estimation unit 24 may identify the empty parking spots, that is, parking spots available for parking, within the parking lot where the vehicle is currently located. In this case, the target parking spot estimation unit 24 may identify, with respect to parking spots far from the vehicle as well as parking spots close to the current position of the vehicle, whether the parking spots are occupied or not.

The target parking spot estimation unit 24 may identify the empty parking spots within the parking lot where the vehicle is currently located, based on the surrounding environment information and the surrounding environment image data received through the environment information collection unit 23. In this case, the target parking spot estimation unit 24 may identify the empty parking spots among parking spots close to the current position of the vehicle.

The target parking spot estimation unit 24 may identify the drivers parking intention based on the parking map information received from the parking system 30, driver behavior information (e.g., driver gaze information) obtained through the driver information collection unit 21, the vehicle status information and the vehicle position information obtained through the vehicle information collection unit 22, and the like. That is, the target parking spot estimation unit 24 may estimate a parking spot (hereinafter, called a "target parking spot") intended by the driver within the parking lot where the vehicle is currently located, based on the above-mentioned information.

In order to estimate the target parking spot, firstly as described above, the target parking spot estimation unit 24 may identify at least one parking spot close to the current position of the vehicle among the identified empty parking spots. Then, the target parking spot estimation unit 24 may estimate the target parking spot intended by the driver from among the parking spots identified based on the current gear-stage information of the vehicle, the steering information of the vehicle, the driver's gaze information (e.g., the gaze direction), and the like. Based on the driver's gaze information and the steering information of the vehicle, the target parking spot estimation unit 24 may determine to select, as the target parking spot, a parking spot positioned in which direction among left side and right side of the vehicle. In this case, when one of the left side and the right side of the vehicle is selected, the target parking spot estimation unit 24 may select, as the target parking spot, a parking spot positioned forward, lateral, or rearward to the driver in selected direction, based on which direction among forward, lateral, and rearward of the driver is indicated by the gaze information. In addition, the target parking spot estimation unit 24 may determine, based on the current gear-stage information of the vehicle and the steering information of the vehicle, a parking spot positioned in which direction is to be selected as the target parking spot. In this case, the target parking spot estimation unit 24 may select one direction from the left side and the right side of the vehicle based on the steering information of the vehicle, and may determine, in the selected left side or right side direction, which direction of the parking spot is to be selected as the target parking spot among parking spots positioned forward, lateral, and rearward of the vehicle, based on the steering information of the vehicle.

For example, when the driver's gaze direction is directed left side forward while the vehicle is in a stopped state by the brake pedal operation, and a rotated state of the steering wheel toward the left side is maintained for more than a predetermined period, the target parking spot estimation unit 24 may estimate, as the target parking spot, a parking spot positioned left side forward of the driver (or the vehicle). In addition, for example, when the current gear-stage of the vehicle is in a reverse gear position while the vehicle is in a stopped state by the brake pedal operation, and a rotated state of the steering wheel toward the right side is maintained for more than a predetermined period, the target parking spot estimation unit 24 may estimate, as the target parking spot, a parking spot positioned right side rearward. In addition, for example, when the driver's gaze is directed to left side lateral while the vehicle is in a stopped state by the brake pedal operation, and a rotated state of the steering wheel toward the left side is maintained for more than a predetermined period, the target parking spot estimation unit 24 may select, as the target parking spot, a parking spot positioned left side lateral of the vehicle.

When the target parking spot intended by the driver is estimated by the target parking spot estimation unit 24, the parking path obtaining unit 25 of the control device 18 may obtain the parking path for parking the vehicle at the corresponding parking spot. That is, the parking path obtaining unit 25 may obtain position information and shape information of the target parking spot from the parking map information received from the external parking system 30, and may generate the parking path of the vehicle based on the current position information of the vehicle and the surrounding environment information of the vehicle collected through the environment information collection unit 23. The parking path information may include, a moving path of the vehicle from the current position to the target parking spot until finishing parking in the target parking spot, vehicle operation information for each link included in the moving path, and the like. Here, the vehicle operation information may include a gear-stage position, a steering angle, a moving speed, and the like.

The vehicle controller 26 of the control device 18 may control the autonomous parking mode operation of the vehicle system 10. When the current position of the vehicle is included in the parking lot including the at least one parking spot, and the stopped state of the vehicle by the brake pedal operation is maintained for more than a predetermined period, the vehicle controller 26 may operate the vehicle system 10 in the autonomous parking mode. At this time, the vehicle controller 26 may operate the vehicle system 10 in the autonomous parking mode only when the parking system 30 controlling the parking lot where the vehicle is currently located exists, and the parking map information for the autonomous parking is received the parking system 30. When the vehicle under operation in the autonomous parking mode finishes the parking by execution of the autonomous parking function, exits from the parking lot, or starts driving, the vehicle controller 26 may release the autonomous operation mode of the vehicle.

The vehicle controller 26 may control information displayed on a screen of the display device 15. For example, when the vehicle system 10 operates in the autonomous parking operation mode, the vehicle controller 26 may display, on the display device 15, a 2-dimensional or 3-dimensional image (hereinafter, called a "the parking lot image") representing the parking lot where the vehicle is currently located, based on a parking image information received from the parking system 30.

Figure 2A:
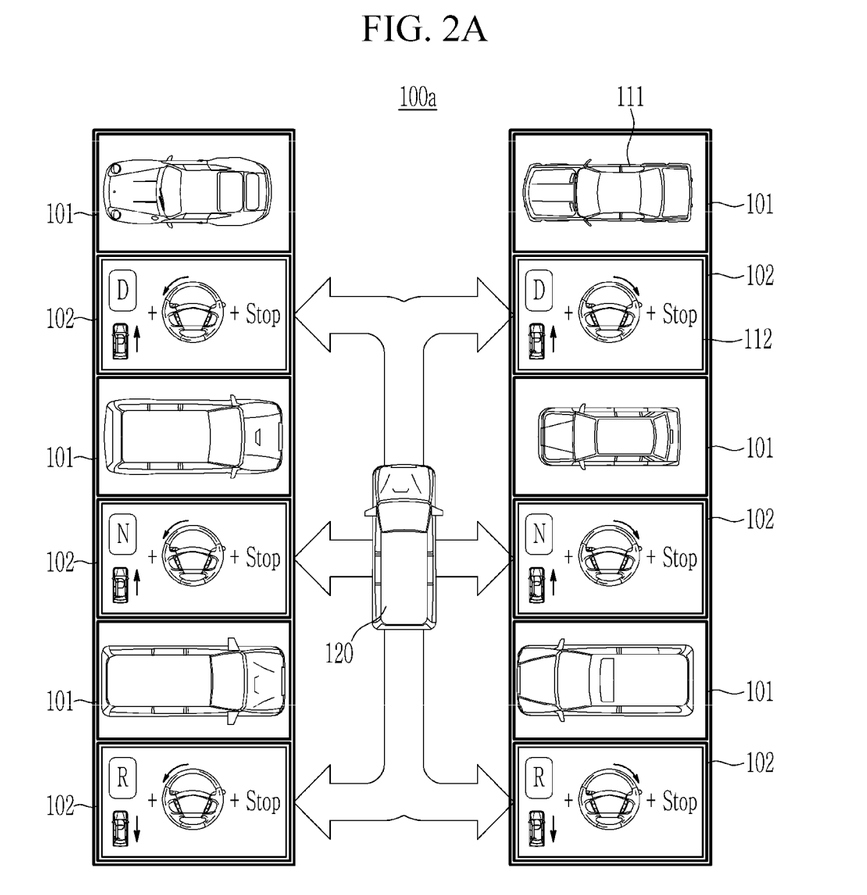
FIG. 2A and FIG. 2B illustrate examples of a parking lot image displayed in a vehicle system according to an exemplary embodiment.
Figure 2B:
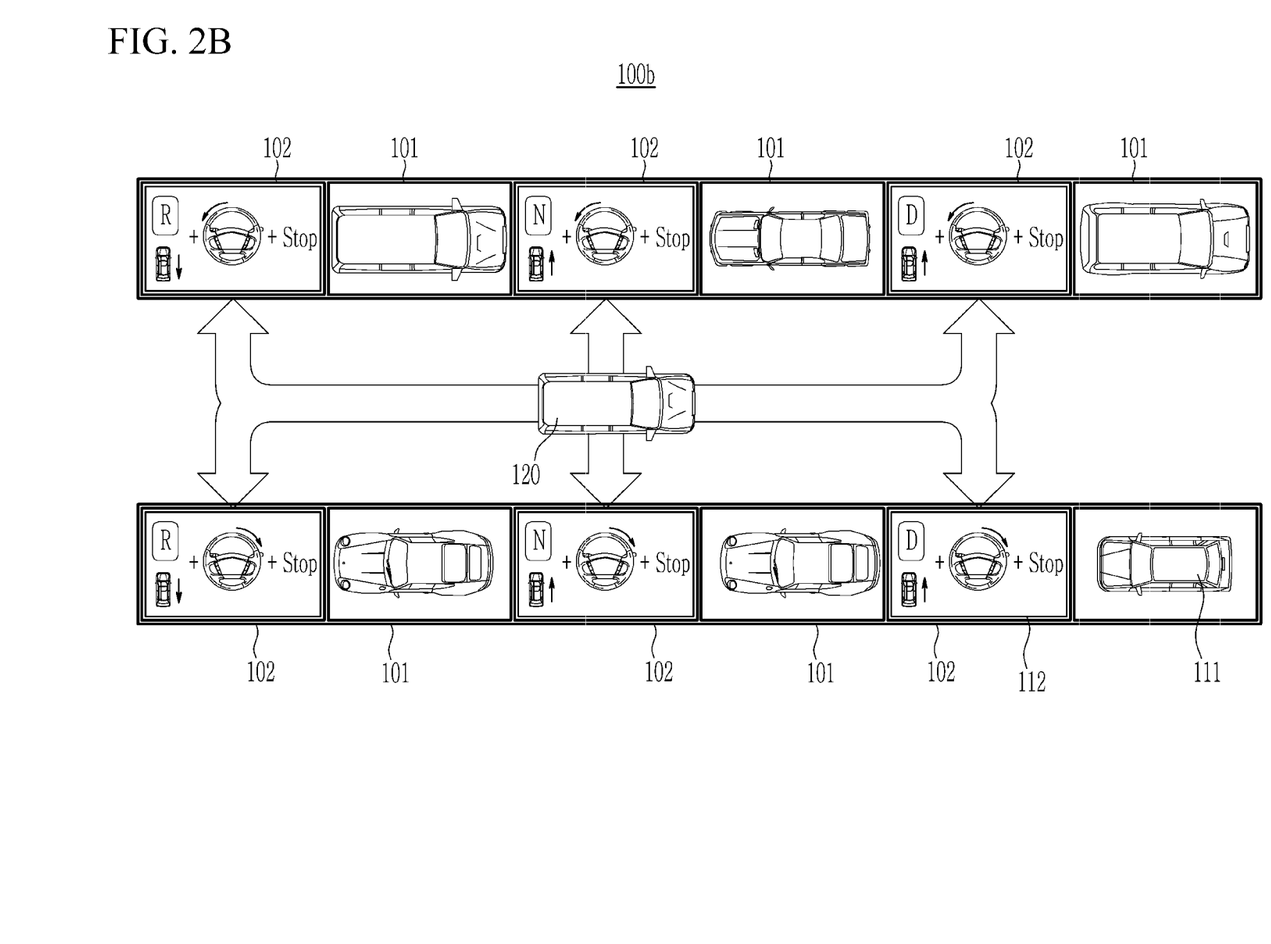

FIG. 2A and FIG. 2B illustrate examples of the parking lot image displayed by the display device 15, where FIG. 2A represents the parking lot of a perpendicular parking scheme and FIG. 2B represents the parking lot of a parallel parking scheme. Referring to FIG. 2A and FIG. 2B, the parking lot images 100*a* and 100*b* may include parking spots 101 and 102 included in the parking lot, and a graphic object 120 indicating the current position of the vehicle within the parking lot. In addition, the parking lot images 100*a* and 100*b* may further include a graphic object or a graphic effect to distinguish a current parked state of each of the parking spots 101 and 102, that is, whether occupied by another vehicle or empty.

For example, in the parking lot images 100*a* and 100*b*, a graphic object 111 (for example, a graphic object of a vehicular shape, a text indicating occupation, and the like) may displayed at the parking spot 101 occupied by another vehicle. In addition, for example, in the parking lot images 100*a* and 100*b*, the parking spot 101 occupied by another vehicle and an empty parking spot 102 may be displayed in different colors. In addition, for example, in the parking lot images 100*a* and 100*b*, a separate graphic effect (blinking, highlight, and the like) may be applied to the currently empty parking spot 102. In addition, for example, in the parking lot images 100*a* and 100*b*, a guide information 112 for guiding the vehicle operation method for selecting the currently empty parking spot 102 as the target parking spot may be disposed at the empty parking spot 102.

Figure 3:
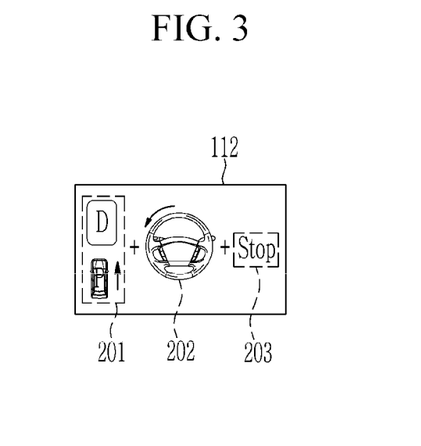
FIG. 3 illustrates an example of autonomous parking guide information displayed in a vehicle system according to an exemplary embodiment.

FIG. 3 illustrates an example of the guide information 112 for the autonomous parking. Referring to FIG. 3, the guide information 112 may include graphic objects 201, 202, and 203 representing vehicle operation method for selecting respective parking spots as the target parking spot. For example, the guide information 112 may include the graphic object 201 indicating the gear-stage position (for example, drive D, neutral N, reverse R), the graphic object 202 indicating the steering direction of the vehicle, and the graphic object 203 indicating the stoppage of the vehicle. The graphic objects 201, 202, and 203 included in the guide information 112 may be sequentially arranged according to an operation sequence. With an example of FIG. 3, the guide information 112 is information for guiding the vehicle operation method for selecting parking spot positioned front-left side of the vehicle as the target parking spot. With the example of the guide information 112 in FIG. 3, the parking spot positioned at the front-left side may be selected as the target parking spot by the driver, by positioning the gear-stage of the vehicle to the forward gear position (refer to the graphic object 201), rotating the steering wheel of the vehicle to the left side (refer to the graphic object 202), and then waiting for a predetermined period in this stopped state (refer to the graphic object 203).

Meanwhile, in FIG. 2A and FIG. 2B, the guide information 112 for selecting the parking spot 102 as the target parking spot is displayed in a corresponding parking spot on the parking lot image 100. However, it may be understood that the guide information 112 may be displayed in a separate area from the parking lot image 100, or in a separate screen. In this case, the display position or display sequence of the graphic objects 201, 202, and 203 of FIG. 3 forming the guide information 112 may be determined according to an execution order. For example, the graphic objects 201, 202, and 203 forming the guide information 112 may be displayed to the left as the execution order is earlier and to the right as the execution order is later. In this case, among the graphic objects 201, 202, and 203 forming the guide information 112, a graphic object of which the operation is finished may be deactivated in the display, or a color, a shape, and the like of the display may be changed. In addition, for example, the graphic objects 201, 202, and 203 forming the guide information 112 may be sequentially displayed according to the execution order. That is, a graphic object indicating a current operation stage is displayed on the display device 15, and when the operation stage is finished, the currently displayed graphic object is deactivated and then another graphic object indicating a subsequent operation stage may be newly displayed.

Referring back to FIG. 1, the estimation for the target parking spot is successfully finished by the target parking spot estimation unit 24, The vehicle controller 26 may display information about the parking spot selected as the target parking spot through the display device 15. For example, in the parking map information 100a and 100b of FIG. 2A and FIG. 2B, the vehicle controller 26 may display the information for the target parking spot on the screen, by adjusting the color of the area corresponding to the target parking spot, by additionally displaying a graphic object indicating the parking spot selected as the target parking spot, or by adding a graphic effect (blinking, highlight, and the like) to the area corresponding to the target parking spot.

Figure 4:
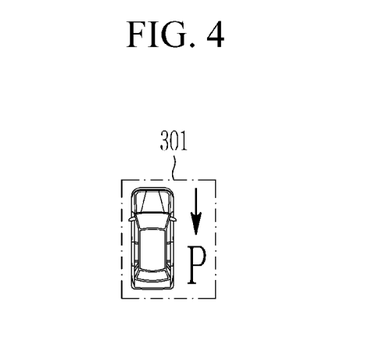
FIG. 4 illustrates an example of a graphic object displayed to indicate that autonomous parking is under execution in a vehicle system according to an exemplary embodiment.

When the vehicle maintains its current status for more than a predetermined period after the target parking spot is estimated by the target parking spot estimation unit 24, that is, when the vehicle's steering wheel and the stopped state at the estimation of the target parking spot is maintained for more than a predetermined period, the vehicle controller 26 may determine that the driver has determined the corresponding parking spot as the target parking spot. Accordingly, as shown in FIG. 4, the vehicle controller 26 may display, through the display device 15, a graphic object 301 indicating that the selection of the target parking spot is confirmed and the autonomous parking is executed. In addition, the vehicle controller 26 may output, through the audio output device 16, a voice signal informing execution of the autonomous parking (for example, "hands off the steering wheel", "release the brake", and the like). In addition, the vehicle controller 26 may receive the parking path information to the confirmed target parking spot through the parking path obtaining unit 25, and may control the vehicle to be parked at the target parking spot by controlling steering, acceleration/deceleration, gear-shifting, stoppage, and the like of the vehicle based on the received parking path information and the surrounding environment information of the vehicle.

Meanwhile, in FIG. 1, the disclosure is reference to the case in which the function of obtaining the parking path information to the target parking spot and moving and parking the vehicle to the target parking spot based on the parking path is performed by the vehicle system 10, but an exemplary embodiment of the present disclosure is not limited thereto. For example, in another exemplary embodiment, when the target parking spot is determined, the parking system 30 may generate the parking path information based on the position information of the target parking spot, the current position information of the vehicle, the surrounding environment information of the vehicle, the facilities information of the parking lot, and the like, and then transmit the parking path information to the vehicle system 10. In addition, in still another exemplary embodiment, the parking system 30 may take over the control of the vehicle from the vehicle system 10, and then park the vehicle at the target parking spot by directly controlling the vehicle based on the generated parking path information, as described above.

Figure 5:
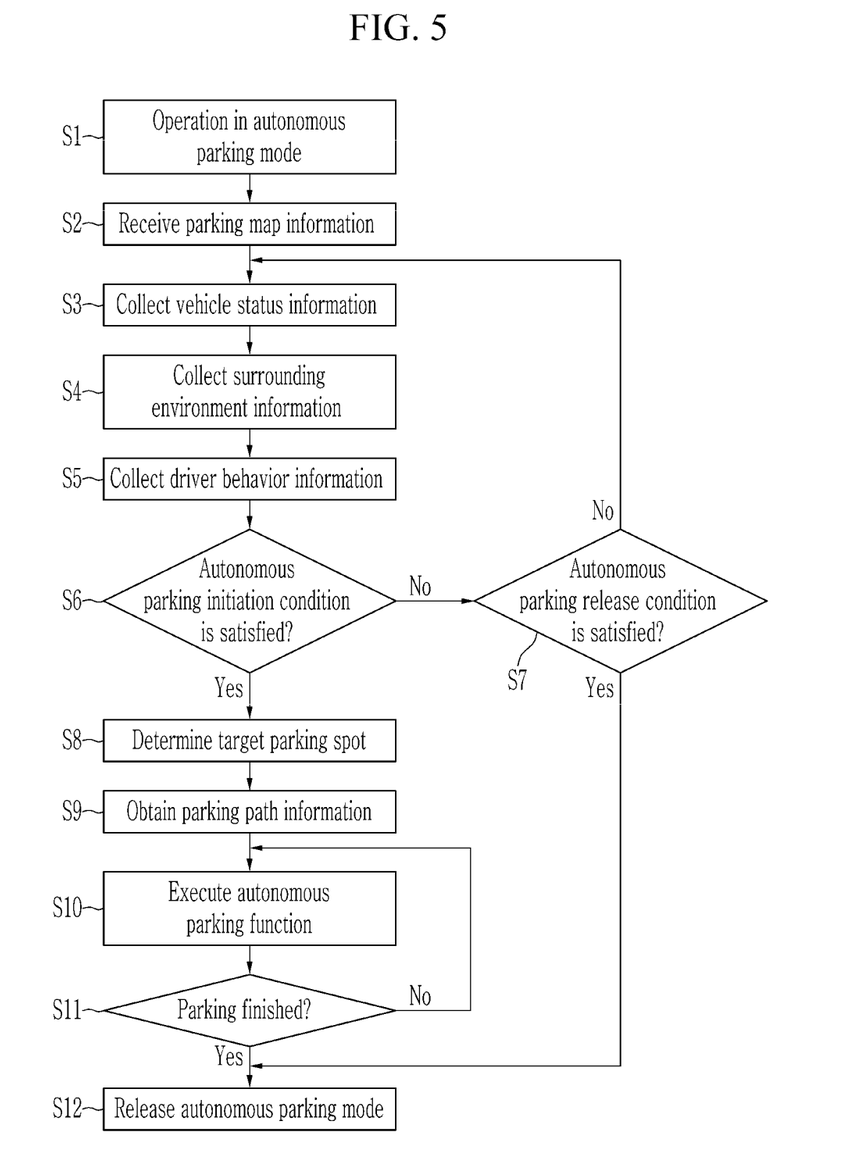
FIG. 5 schematically illustrates an autonomous parking method according to an exemplary embodiment

FIG. 5 schematically illustrates the autonomous parking method according to an exemplary embodiment. FIG. 5 may be performed by the vehicle system 10 described with reference to FIG. 1.

Referring to FIG. 5, the vehicle system 10 operates in the autonomous parking mode at step S1, and receives, at step S2, the parking map information of the parking lot where the vehicle is currently located from the parking system 30.

At the step S1, when the stopped state by the brake pedal operation is maintained for more than a predetermined time while the vehicle has entered the parking lot managed by the parking system 30, the vehicle system 10 may estimate that the driver intends to park the vehicle in the parking lot, and then enter the autonomous parking mode.

The vehicle system 10 operating in the autonomous parking mode may collect the vehicle status information through the sensing device 13 at step S3, collect the surrounding environment information through the sensing device 13, the camera system 14, and the like at step S4, and collect behavior information including the driver's gaze information through the camera system 14 at step S5. Meanwhile, FIG. 5 illustrates that the vehicle status information collection, the surrounding environment information collection, and the driver behavior information collection are collected in the listed sequence, however, an exemplary embodiment of the present disclosure is not limited thereto. The sequence of collecting the vehicle status information, the surrounding environment information, the driver behavior information may be varied depending on embodiments.

When above-mentioned information is collected, the vehicle system 10 may identify, at step S6, whether the current status of the vehicle or the driver's behavior satisfies the autonomous parking initiation condition. That is, the vehicle system 10 may identify whether the current running state of the vehicle is the stopped state, and whether the current gear-stage position of vehicle or the driver's gaze information, and the operation direction of the steering wheel satisfy the autonomous parking initiation condition. For example, the vehicle system 10 may determine that the autonomous parking initiation condition is satisfied when, while the vehicle is in a stopped state by the brake pedal operation, the driver's gaze direction is directed to the left side or right side, and the steering wheel rotated in the same direction with driver's gaze is maintained for more than a predetermined time.

When the autonomous parking initiation condition is not satisfied (S6—No), the vehicle system 10 may identify, at step S7, whether the vehicle satisfies the autonomous parking mode release condition. For example, the vehicle system 10 may determine that the autonomous parking mode release condition is satisfied when the vehicle restarts driving, or when the vehicle exits the parking lot. In addition, for example, the vehicle system 10 may determine that the autonomous parking mode release condition is satisfied when the parking of the vehicle is finished by manual operation of the driver.

When it is identified that the autonomous parking mode release condition is satisfied identify (S7—Yes), the vehicle system 10 may release the autonomous operation mode at step S12. Whereas, when the autonomous parking mode release condition is not satisfied (S7—No), the vehicle system 10 may maintain the autonomous parking mode to repeat the steps S3 to S6.

When it is identified that the autonomous parking initiation condition is satisfied (S6—Yes), the vehicle system 10 may determine the target parking spot at step S8 based on the parking map information, the vehicle status information, and the driver behavior information. That is, the vehicle system 10 may obtain information of the empty parking spots among the parking spots close to vehicle, and determine the target parking spot intended by the driver among the empty parking spots close to the vehicle based on the current gear-stage information of the vehicle or the driver's gaze information, and the steering information of the vehicle.

For example, when the current gear-stage of the vehicle is in a reverse gear position while the vehicle is in a stopped state by the brake pedal operation, and a rotated state of the steering wheel toward the right side is maintained for more than a predetermined period, the vehicle system 10 may estimate, as the target parking spot, the parking spot positioned rearward right side. In addition, for example, when, while the vehicle is in a stopped state by the brake pedal operation, the driver's gaze is directed to the left side direction, and a rotated state of the steering wheel toward the left side is maintained for more than a predetermined period, the vehicle system 10 may select, as the target parking spot, the parking spot closest to the current position of the vehicle among the empty parking spots located in the left side of the vehicle. As such, when the target parking spot is determined, the vehicle system 10 may display the information about the target parking spot through the display device 15, to enable the driver to identify whether a desired parking spot is selected as the target parking spot.

When the target parking spot is confirmed through the step S8, the vehicle system 10 may obtain, at step S9, the parking path information of the vehicle for parking the vehicle at the determined target parking spot. For example, the vehicle system 10 may obtain position information and shape information of the target parking spot from the parking map information received from the parking system 30, and generate the parking path of the vehicle based on the current position information of the vehicle and the surrounding environment information. In addition, for example, the vehicle system 10 may receive the parking path information of the vehicle from the parking system 10. In this case, the parking system 30 may receive the position information of the target parking spot, the current position information of the vehicle, the surrounding environment information of the vehicle, and the like from the vehicle system 10, and generate the parking path information of the vehicle based on such information and the facilities information of the parking lot, and the like.

When the parking path information to the target parking spot is generated, the vehicle system 10 executes the autonomous parking function at step S10, to control the vehicle to be parked at the target parking spot. That is, the vehicle system 10 may control the vehicle to be parked at the target parking spot by controlling the steering, acceleration/deceleration, gear-shifting, stoppage, and the like of the vehicle according to the parking path information. When the parking of the vehicle is finished by the execution of the autonomous parking function at step S11, the vehicle system 10 may release the autonomous parking mode at step S12.

The autonomous parking method of the vehicle according to an embodiment may be executed by software. When executed as software, the components of the present disclosure are code segments that execute the necessary work. Program or code segments may be stored on a processor readable function medium or transmitted by a computer data signal coupled to a carrier in a transmission medium or communication network.

A computer-readable recording medium includes all kinds of recording devices in which data that may be read by a computer system is stored. Examples of computer-readable recording devices include ROM, RAM, CD-ROM, DVD_ROM, DVD_RAM, magnetic tape, floppy disk, hard disk, optical data storage device, and the like. In addition, the computer-readable recording medium may be distributed to computer devices connected to a network such that computer-readable codes may be stored and executed in a distributed manner.

The drawing referenced so far and the detailed description of the described inventive concepts are merely examples of the present disclosure, which are used only for the purpose of describing the present disclosure, and they are not used for limiting the meaning or the range of the present disclosure described in claims. Therefore, such examples may be easily selected and replaced by those of ordinary skill in the art. In addition, a person of an ordinary skill in the art may omit some of the constituent elements described in this specification without degradation of performance, or add a constituent element to improve performance. In addition, a person of an ordinary skill in the art may change the sequence of the method steps described in this specification according to the process environment or equipment. Therefore, the range of the present disclosure should be determined not by the described embodiment, but by the claims and their equivalents.

DESCRIPTION OF SYMBOLS

10: vehicle system
11: communication device
12: user input device
13: sensing device
14: image photographing device
15: display device
16: audio output device
17: storage device
18: control device
21: driver information collection unit
22: vehicle information collection unit
23: environment information collection unit
24: target parking spot estimation unit
25: parking path obtaining unit
26: vehicle controller
30: parking system
100: parking lot image
101, 102: parking spot

What is claimed is:

1. A vehicle system, comprising:
a sensing device configured to detect vehicle status information including gear-stage information and steering information of a steering wheel; and
a control device configured to determine a target parking spot among parking spots included in a parking lot based on the gear-stage information and the steering information when the vehicle maintains a stopped state for more than a predetermined period in the parking lot, and to execute an autonomous parking function for parking at the target parking spot.

2. The vehicle system of claim 1, wherein the control device is configured to determine a parking spot positioned on a left side of the vehicle, or a parking spot positioned on a right side of the vehicle as the target parking spot based on a steering direction of the steering wheel.

3. The vehicle system of claim 2, wherein the control device is configured to determine a parking spot positioned at a front, a side, or a rear of the vehicle as the target parking spot based on the gear-stage information.

4. The vehicle system of claim 1, further comprising at least one camera positioned in the vehicle,
wherein the control device is configured to obtain driver's gaze information through the at least one camera, and to determine the target parking spot by additionally using the gaze information.

5. The vehicle system of claim 4, wherein the control device is configured to determine a direction toward the target parking spot relative to the vehicle based on a gaze direction corresponding to the gaze information and a steering direction of the steering wheel.

6. The vehicle system of claim 5, wherein the control device is configured to determine, as the target parking spot, a parking spot determined by a combination of the steering direction and a direction indicated by the gaze direction among forward, lateral, and rearward of left side or right side of the vehicle.

7. The vehicle system of claim 1, further comprising a display device,
wherein the control device is configured to display a parking lot image corresponding to the parking lot through the display device, and to provide position information for the target parking spot determined by the vehicle to a driver by operating the display device such that a parking spot in the parking lot image determined as the target parking spot blinks, or that a parking spot determined as the target parking spot is highlighted.

8. The vehicle system of claim 7, further comprising a communication device configured to communicate with a parking system managing the parking lot,
wherein the control device is configured to receive parking map information corresponding to the parking lot from the parking system, to identify at least one empty parking spot within the parking lot based on the parking map information, and to determine the target parking spot from among the at least one empty parking spot.

9. The vehicle system of claim 1, further comprising at least one detection device configured to obtain surrounding environment information of the vehicle,
wherein the control device is configured to identify at least one empty parking spot within the parking lot based on the surrounding environment information, and to determine the target parking spot from among the at least one empty parking spot, and
wherein the at least one detection device comprises at least one camera or at least one sensor positioned in the vehicle.

10. A vehicle system, comprising:
at least one camera positioned in the vehicle;
a sensing device configured to detect steering information of a steering wheel; and
a control device,
wherein the control device is configured to:
obtain drivers gaze information through the at least one camera;
determine a target parking spot among parking spots included in the parking lot based on the gaze information and the steering information when the vehicle maintains a stopped state for more than a predetermined period in a parking lot; and
execute an autonomous parking function for parking at the target parking spot.

11. The vehicle system of claim 10, wherein the control device is configured to determine a direction toward the target parking spot relative to the vehicle based on a gaze direction corresponding to the gaze information and a steering direction of the steering wheel.

12. The vehicle system of claim 11, wherein the control device is configured to determine, as the target parking spot, a parking spot determined by a combination of the steering direction and a direction indicated by the gaze direction among forward, lateral, and rearward of left side or right side of the vehicle.

13. The vehicle system of claim 10, further comprising a display device,
wherein the control device is configured to display a parking lot image corresponding to the parking lot through the display device, and to provide position information for the target parking spot determined by the vehicle to the driver by operating the display device such that a parking spot in the parking lot image determined as the target parking spot blinks, or that a parking spot determined as the target parking spot is highlighted.

14. The vehicle system of claim 13, further comprising a communication device configured to communicate with a parking system managing the parking lot,
wherein the control device is configured to receive parking map information corresponding to the parking lot from the parking system, to identify at least one empty parking spot within the parking lot based on the parking map information, and to determine the target parking spot from among the at least one empty parking spot.

15. The vehicle system of claim 10, further comprising at least one detection device configured to obtain surrounding environment information of the vehicle,
wherein the control device is configured to identify at least one empty parking spot within the parking lot based on the surrounding environment information, and to determine the target parking spot from among the at least one empty parking spot, and
wherein the at least one detection device comprises at least one camera or at least one sensor positioned in the vehicle.

16. An autonomous parking method of a vehicle, comprising:
obtaining gear-stage information of the vehicle and steering information of a steering wheel,
determining a target parking spot among parking spots included in a parking lot based on the gear-stage information and the steering information when the vehicle maintains a stopped state for more than a predetermined period after entering the parking lot, and
executing, by the vehicle, an autonomous parking function for parking at the target parking spot.

17. The autonomous parking method of claim 16, wherein the determining comprises determining a parking spot positioned on a left side of the vehicle, or a parking spot positioned on a right side of the vehicle as the target parking spot based on a steering direction of the steering wheel.

18. The autonomous parking method of claim 16, wherein the determining comprises:
obtaining drivers gaze information from an image photographing the driver through at least one camera positioned in the vehicle, and
determining the target parking spot by additionally using the gaze information.

19. The autonomous parking method of claim 18, wherein the determining the target parking spot by additionally using the gaze information comprises:

determining a direction toward the target parking spot relative to the vehicle according to a gaze direction corresponding to the gaze information and a steering direction of the steering wheel, and determining the target parking spot at a left side or a right side of the vehicle based on the determined direction.

20. The autonomous parking method of claim 17, wherein the determining comprises determining the target parking spot at a front, a side, or a rear of the vehicle based on a current gear-stage position of the vehicle.

21. The autonomous parking method of claim 17, further comprising displaying a parking lot image corresponding to the parking lot on a screen, wherein, in the parking lot image, a parking spot in the parking lot image determined as the target parking spot blinks, or a parking spot determined as the target parking spot is highlighted, to provide position information for the target parking spot determined by the vehicle to a driver.

22. The autonomous parking method of claim 17, further comprising:

receiving parking map information corresponding to the parking lot from a parking system managing the parking lot; and identifying at least one empty parking spot within the parking lot based on the parking map information, wherein the determining comprises determining the target parking spot from among the at least one empty parking spot.

23. The autonomous parking method of claim 17, further comprising:

obtaining surrounding environment information of the vehicle through at least one detection device; and identifying at least one empty parking spot within the parking lot based on the surrounding environment information, wherein the determining comprises determining the target parking spot from among the at least one empty parking spot, and wherein the at least one detection device comprises at least one camera or at least one sensor positioned in the vehicle.

24. An autonomous parking method of a vehicle, comprising:

obtaining driver's gaze information from an image photographing a driver through at least one camera positioned in the vehicle;

detecting steering information of a steering wheel;

determining a target parking spot among parking spots included in a parking lot based on the gaze information and the steering information when the vehicle maintains a stopped state for more than a predetermined period in the parking lot; and executing an autonomous parking function for parking at the target parking spot.

25. The autonomous parking method of claim 24, wherein the determining comprises determining the target parking spot at a left side or a right side of the vehicle based on a gaze direction corresponding to the gaze information and a steering direction of the steering wheel.

26. The autonomous parking method of claim 24, further comprising displaying a parking lot image corresponding to the parking lot on a screen, wherein, in the parking lot image, a parking spot in the parking lot image determined as the target parking spot blinks, or a parking spot determined as the target parking spot is highlighted, to provide position information for the target parking spot determined by the vehicle to the driver.

27. The autonomous parking method of claim 24, further comprising:

receiving parking map information corresponding to the parking lot from a parking system managing the parking lot; and identifying at least one empty parking spot within the parking lot based on the parking map information, wherein the determining comprises determining the target parking spot from among the at least one empty parking spot.

28. The autonomous parking method of claim 24, further comprising:

obtaining surrounding environment information of the vehicle through at least one detection device; and identifying at least one empty parking spot within the parking lot based on the surrounding environment information, wherein the determining comprises determining the target parking spot from among the at least one empty parking spot, and wherein the at least one detection device comprises at least one camera or at least one sensor positioned in the vehicle.

* * * * *